(12) United States Patent
Kasai et al.

(10) Patent No.: US 6,435,420 B1
(45) Date of Patent: Aug. 20, 2002

(54) ENGINE WASTE HEAT RECOVERING APPARATUS

(75) Inventors: Akihito Kasai; Takahiro Ideguchi; Yoshinori Nakagawa, all of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/695,710

(22) Filed: Oct. 25, 2000

(30) Foreign Application Priority Data

Nov. 1, 1999 (JP) .......................... 11-311248

(51) Int. Cl.$^7$ .............................. G05D 23/00
(52) U.S. Cl. .................. 237/213; 237/12.1; 237/19; 126/362
(58) Field of Search .................. 237/12.1, 19, 8 A, 237/2 A; 165/18; 62/238.6, 435

(56) References Cited

U.S. PATENT DOCUMENTS

| 4,342,422 A | * | 8/1982 | Davis .......................... 237/19 |
| 4,412,509 A | * | 11/1983 | Black ....................... 122/13.01 |
| 5,000,003 A | | 3/1991 | Wicks |
| 5,226,594 A | * | 7/1993 | Swenson ..................... 237/2 B |
| 5,279,637 A | * | 1/1994 | Lynam et al. ................. 165/92 |
| 5,320,166 A | * | 6/1994 | Swenson ..................... 165/18 |
| 5,366,153 A | * | 11/1994 | Swenson ..................... 237/19 |

FOREIGN PATENT DOCUMENTS

| DE | 29 16 216 A1 | 11/1980 |
| DE | 30 32090 A1 | 4/1982 |
| RU | 2043532 C1 | 9/1995 |

* cited by examiner

*Primary Examiner*—Harold Joyce
*Assistant Examiner*—Derek S. Boles
(74) *Attorney, Agent, or Firm*—Armstrong, Westerman & Hattori, LLP

(57) ABSTRACT

Since the starting of an engine at a lower temperature is troublesome, the temperature of the engine is measured by a sensor. When the measured temperature is lower than a reference temperature, the pump is first switched on for circulating a thermal medium. This permits the thermal medium to transfer heat of the hot water stored in a hot water storage tank to the engine, hence warming the engine, decreasing the viscosity of the oil, and preventing the generation of dew in the engine to ease the start up of the engine.

5 Claims, 3 Drawing Sheets

ENGINE WASTE HEAT RECOVERING APPARATUS

BACKGROUND OF THE INVENTION

1. Field of the Invention

The present invention relates to a combustion engine waste heat recovering apparatus and particularly to a heat recovering apparatus for recovering heat generated by an engine used as a power source in cogeneration system.

2. Description of the Related Art

As the need for global environmental protection has been focused, cogeneration system are widely proposed for electric power generation and hot water supply with the use of a gas engine as the power source which consumes city gas as a fuel. Such a type of cogeneration systems are favorably used in cold districts in view of the effectiveness in the use of heat. However, as the viscosity of an engine oil in the gas engine becomes high in winters or every chilly morning and night when the air temperature is low, a large torque is needed for starting the engine.

Also, although depending on the condition of a mixture of fuel and air, water in the non-combusted mixture gas or the remaining exhaust gas may condenses into small droplets in low temperatures thus disturbing the ignition of an ignition plug.

It is known that the above drawback can simply be eliminated by use of an electric heater for warming up the engine. However, if there is only a limited room about the engine for mounting the electric heater, a sufficiently powerful type of the electric heater can hardly be installed. Even when there is a room for a bulky type of the electric heater with sufficient power, the consumption of electric power of the electric heater is considerably high and may be uneconomical.

SUMMARY OF THE INVENTION

It is an object of the present invention to provide an engine waste heat recovering apparatus capable of warming up the engine with the action of a heat recovery pump without using such a bulky component as an electric heater requiring a sizable space for installation.

As a first feature of the present invention, an engine waste heat recovering apparatus which circulates a thermal medium through a heat recovery section of the engine to recover exhaust heat from the engine, comprising: a conduit for circulating the thermal medium across a heat exchanger in an external hot water storage tank, a pump mounted across the conduit, a means for measuring the temperature of the engine, and a controller for switching on the pump before starting the engine when the temperature of the engine at the start up is lower than a reference temperature predetermined for permitting the engine to be started.

As a second feature of the present invention, the heat recovery section of the engine includes an engine cooling unit equipped with a water jacket and an oil heat exchanger for recovering heat from the engine oil, and the circulation path is routed so that the thermal medium runs from the oil heater exchanger to the engine cooling unit.

As a third feature of the present invention, further comprising an exhaust gas heat exchanger for use of exhaust gas from the engine which is mounted across the circulation path at the upstream side of the engine cooling unit and wherein the thermal medium to be conveyed into the exhaust gas heat exchanger is controlled to be at a low temperature so that vapor contained in the exhaust gas of which heat is transferred to the thermal medium, drops down to below its dew point.

As a fourth feature of the present invention, the pump is mounted on the thermal medium inlet side of the oil heat exchanger.

According to the first to fourth features of the present invention, when the temperature of the engine is lower than the reference temperature at the start up of it, the pump is switched on before starting up the engine. This allows the thermal medium kept at a lower temperature by the outer ambient thermal condition in a cold district or in the early morning to be heated by the hot water stored in the separately equipped hot water storage tank through the action of heat exchange. The thermal medium is then conveyed to the heat recovery section of the engine for warming up the engine.

According to the second feature of the present invention, the thermal medium is first conveyed into the oil tank where the oil heat exchanger is installed, hence effectively warming the oil of which the viscosity is high at a lower temperature and readily decreasing the viscosity. After the engine is started and operated in the normal driving mode, the engine oil heated up through the operation of the engine can be efficiently cooled down by the thermal medium.

According to the third feature of the present invention, the temperature of the thermal medium conveyed into the exhaust gas heat exchanger is controlled so that water vapor contained in the exhaust gas drops down to below its dew point. This permits the thermal medium to recover heat from the exhaust gas as well as condensation heat and then be transferred to the engine cooling unit at the downstream of the circulation path where its temperature is increased higher. The thermal medium is further conveyed to the output heat exchanger where its abundantly recovered thermal energy is released.

According to the fourth feature of the present invention, the thermal medium is passed through the pump before recovering heat from the engine. This allows the pump to stay at a relatively low temperature thus minimizing the degradation with time of packings and other sealants.

DETAILED DESCRIPTION OF THE PREFERRED EMBODIMENTS

Figure 2:
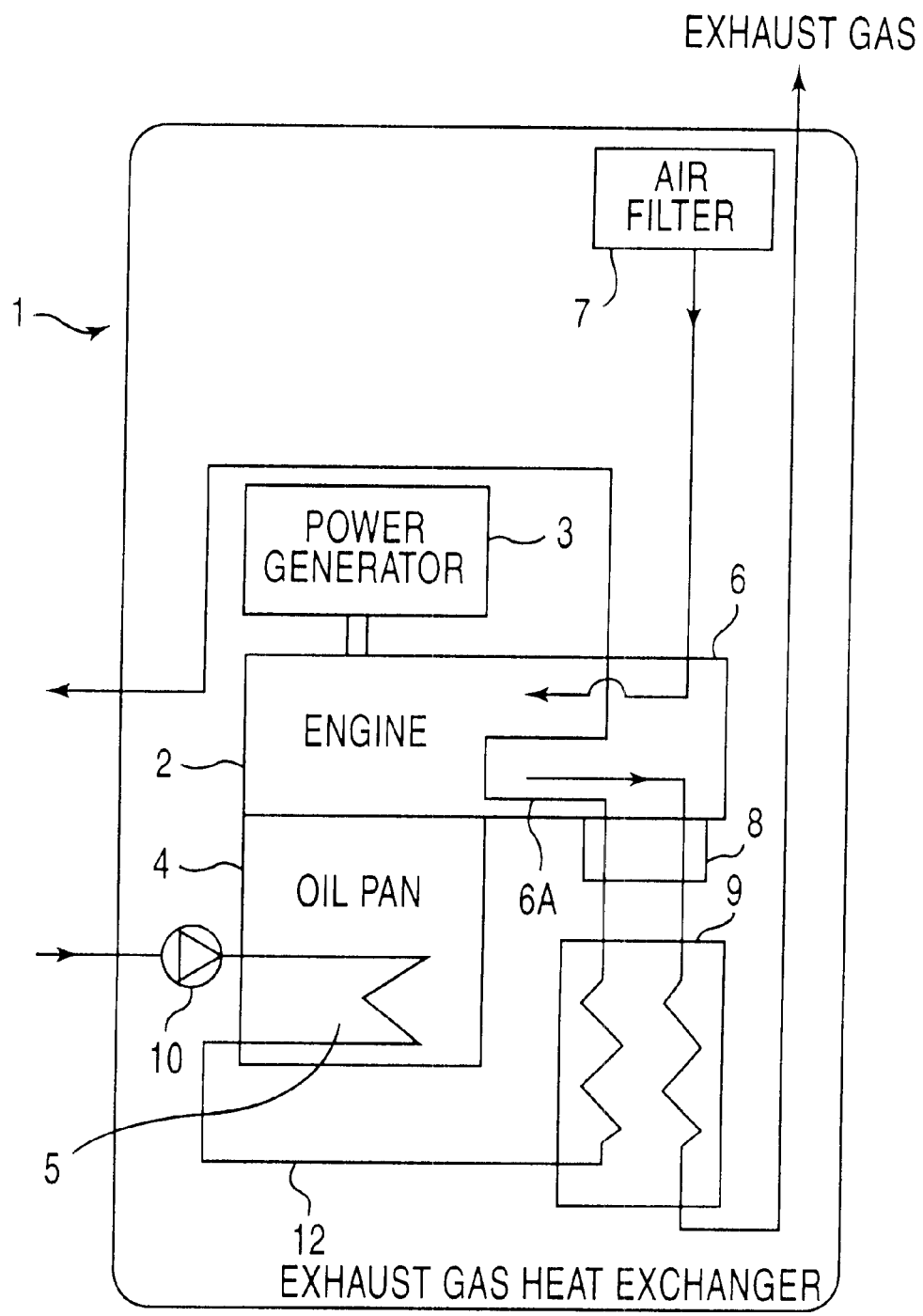
FIG. 2 is a block diagram showing a primary part of the waste heat recovering apparatus according to the embodiment of the present invention.

One embodiment of the present invention will be described in detail referring to the relevant drawings. Referring to FIG. 2, a waste heat recovering apparatus 1 installed in a cogeneration system is designed for recovering heat from the engine of an engine-driven power generator. The waste heat recovering apparatus 1 comprises the engine 2 and the power generator 3 mechanically connected to the engine 2. The power generator 3 generates an alternating current corresponding to the number of revolutions of the engine 2. The engine 2 is equipped with an oil pan 4 for storage of lubricant oil. The oil pan 4 includes an oil cooler (an oil heat exchanger) 5. The oil heat exchanger 5 transfers heat from the oil in the oil pan 4 to a heat transfer medium (a cooling water). A flow of air is introduced through an air filter 7 into a cylinder head 6 of the engine 2. An exhaust gas from the engine 2 passes through an exhaust manifold 8 and an exhaust gas heat exchanger 9 and then is discharged to the outside of the engine.

A circulation path 12 of the heat transfer medium is provided for effectively recovering the heat generated by the engine 2. A water pump 10 for circulating the heat transfer medium is mounted at the inlet of the circulation path 12. This arrangement allows other components such as seals to come into not direct contact with the heat transfer medium of a high temperature and hardly be degraded in the quality hence contributing to the longer operational life of the water pump 10. As the heat transfer medium is driven by the water pump 10, it runs through the oil heat exchanger 5 in the oil pan 4, the exhaust gas heat exchanger 9, the engine 2, and the cylinder head 6 and passes after a thermal cover 16 to a thermal load which will be described later in more detail.

As the heat transfer medium is circulated along the circulation path 12, it recovers heat generated by the engine 2 and transfers it to the thermal load. More particularly, when the heat transfer medium is fed into the oil heat exchanger 5 in the oil pan 4, it draws heat of the oil received from the engine 2 and cools down the oil. The heat transfer medium is then passed to the exhaust gas heat exchanger 9 where it receives heat from the exhaust gas released from the engine 2. The heat transfer medium increased in the temperature by heat transfer in both the oil heat exchanger 5 and the exhaust gas heat exchanger 9 is further passed through a pass or a water jacket 6A provided as an engine cooling scheme in the cylinder wall and the cylinder head 6 and hence draws more heat, increasing its temperature to a higher level.

Figure 1:
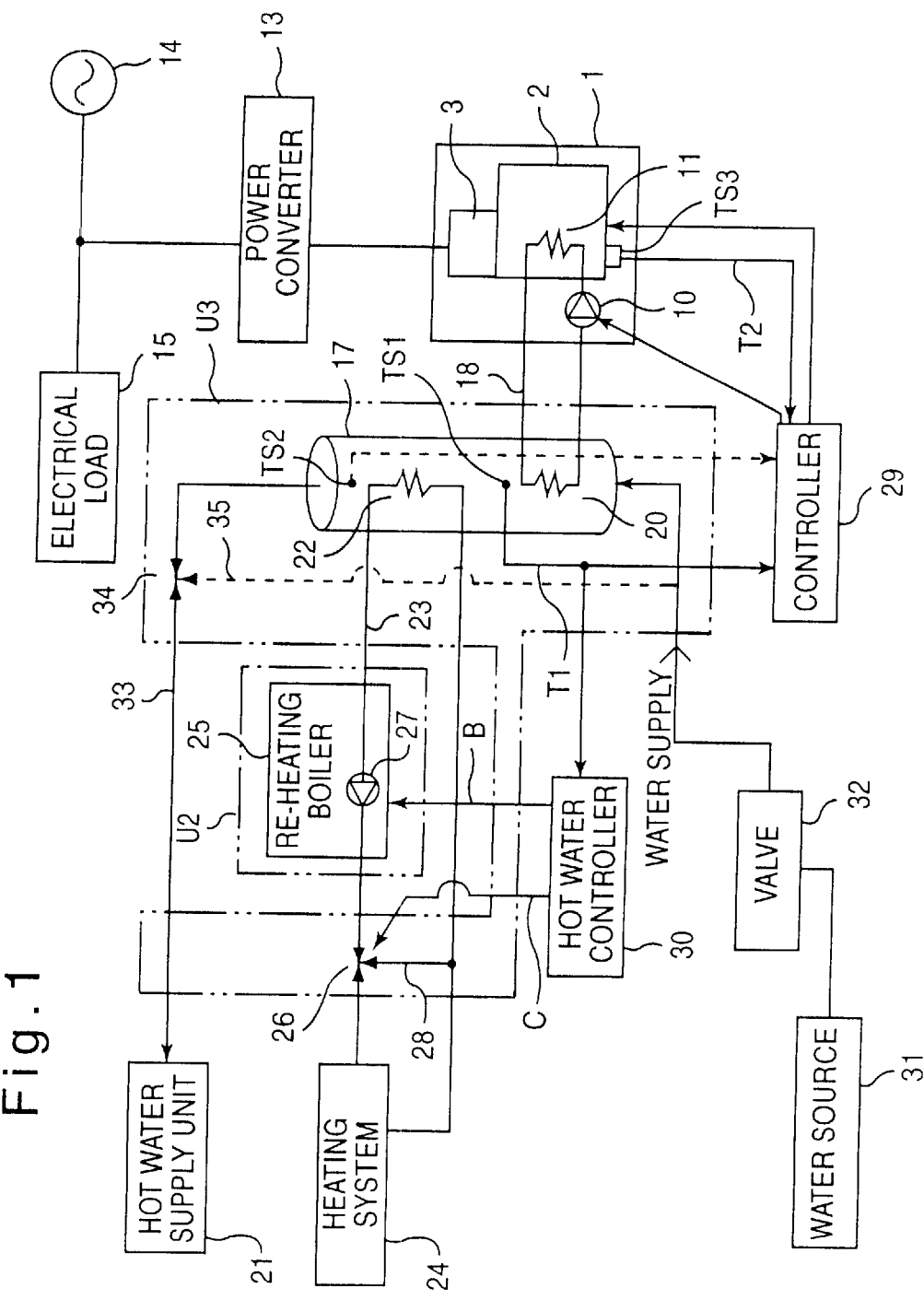
FIG. 1 is a block diagram of an arrangement of a cogeneration system equipped with a waste heat recovering apparatus according to one embodiment of the present invention.

FIG. 1 illustrates an arrangement of a cogeneration apparatus having the engine power generator in its power generator section interconnected to a commercial power supply system.

A power converter 13 has a function of converting the AC output generated by the power generator 3 to an AC current of which the characteristics (of voltage, frequency, noise, etc.) are identical to those of the commercial power supply system and developing synchronization of the phase with the commercial power supply system. More particularly, the power converter 13 comprises a converter for converting the AC output released from the power generator 3 into a DC output, an inverter for inverting the DC output of the converter into an AC form which is identical in the frequency and the voltage to an input from the commercial power supply system, and other functional means including noise filters and interconnecting switches. An example of the power converter interconnected with the other (commercial) systems is disclosed in Japanese Patent Examined Publication (Hei) 4-10302. The AC output generated by the power generator 3 and converted by the power converter 13 is then supplied to an electrical load 15, which is also connected with the commercial power supply system 14.

The heat generated by the engine 2 for driving the power generator 3 is collected through a thermal exchange operation of a water cooling device and heat exchange unit (indicated generally by numeral 11) of exhaust gas heat exchanger 9 or the like. The cooling water which collects heat at heat exchange unit 11 is passed into a hot water storage tank 17 throughout a conduit 18 as used as a medium for carrying the heat to the hot water storage tank 17. The hot water storage tank 17 contains a output heat exchanger (referred to as a first heat exchanger hereinafter) 20 communicated with the conduit 18. The water supplied from a water source 31 to the hot water storage tank 17 is then heated by the first heat exchanger 20 to turn to a hot water. The hot water heated and saved in the hot water storage tank 17 is fed for further use to a hot water supply unit 21, which is a first thermal load.

A valve 32 is provided on a water pipe between the water source 31 and the hot water storage tank 17. The valve 32 is opened for supplying the water when the hot water in the hot water storage tank 17 decreases to below a predetermined level.

The engine 2 has a temperature sensor TS3 for detecting the temperature Te of the engine 2 which is then transferred to a controller 29. When the temperature Te is not lower than a reference temperature Tref-e predetermined for permitting the start of the engine, the controller 29 provides the engine 2 and the water pump 10 with commands to at once start up. When the detected temperature Te is lower than the reference temperature Tref-e, the controller 29 switches on the water pump 10 before starting the engine 2.

As the water pump 10 is actuated, the thermal medium circulates through the conduit 18 which communicates between the first heat exchanger 20 in the hot water storage tank 17 and the heat exchanger 11 of the engine 2. This allows the thermal medium to receive heat from the hot water in the hot water storage tank 17. Then its temperature goes up. As the thermal medium is conveyed to the engine 2, it warms up the engine 2. When the temperature Te measured on the engine 2 reaches the reference temperature Tref-e after the switching on of the water pump 10, the engine 2 is started.

The temperature sensor TS3 is preferably positioned for measuring the temperature of the thermal medium in the cooling unit of the engine 2 and may be located for detecting the temperature on the outer wall of the engine 2 or on any component adjacent to the engine 2. The temperature on the engine 2 may be represented by the ambient temperature. When the ambient temperature is used, the reference temperature Tref-e is replaced by another reference setting which has been determined from experimental measurements for the relationship between the engine temperature and the ambient temperature.

The starting of the engine 2 is not limited to when the temperature Te reaches the reference temperature Tref-e after the water pump 10 is switched on, but may be timed with the time up of a duration determined by a timer upon the water pump 10 switched on.

In this embodiment, as the heat exchanger 11 of the engine 2 is communicated by the conduit 18 to the heat exchanger 20 which is installed in the hot water storage tank 17, vast thermal energy of hot water stored in the hot water storage tank 17 can directly be recovered by the thermal medium and transferred to the engine 2. This allows the engine 2 to be warmed within a shorter time for quick starting.

A second heat exchanger 22 is provided above the first heat exchanger 20 in the tank 17. The second heat exchanger 22 is communicated to a conduit 23, which in turn connected with a heating system 24, such as a central heating system or a floor heating system, acting as a second thermal load. The second conduit 23 forms a second hot water path, which is separated from the hot water path for supplying the hot water from the hot water storage tank 17 to the hot water supply unit 21. The second hot water path 23 performs secondary exchange of the heat from the hot water storage tank 17 thus increasing the efficiency of the heat recovery.

The second heat exchanger 22 is located at a position higher than the first heat exchanger 20 because the hot water heated by the first heat exchanger 20 has a higher temperature and convectively flows upwardly from the first heat exchanger 20. This allows the second heat exchanger 22 to take up more thermal energy from the hot water moved upward by the effect of convection.

In the second hot water path 23, there are also provided a re-heating boiler 25 and a three-directional valve 26. The re-heating boiler 25 is provided with a pump 27 for circulating the hot water throughout the second hot water path 23. The three-directional valve 26 is a means for switching the flow of the hot water to a bypass 28 or to the heating system 24. The following passages are selected by operating the three-directional valve 26. When the three-directional valve 26 is switched to the heating system 24, the passage is opened for conveying the hot water via the re-heating boiler 25 and the heating system 24 from and to the hot water storage tank 17. When the three-directional valve 26 is switched to the bypass 28, the passage is opened for conveying the hot water via the bypass 28, not the heating system 24, from and to the hot water storage tank 17.

A temperature sensor TS1 is provided as a detection means of a thermal medium temperature flowing in the path of thermal load in the hot water storage tank 17. The information about the temperature TI of the hot water measured by the temperature sensor TS1 is transmitted to a controller 29. The temperature sensor TS1 may be located at an appropriate height level between substantially the uppermost of the first heat exchanger 20 and the lowermost of the second heat exchanger 22 and most preferably at a midway between the first heat exchanger 20 and the second heat exchanger 22. It is very likely that, due to the effect of convection, the temperature of the hot water is lower at substantially the lowermost of the hot water storage tank 17 and higher at substantially the uppermost. As the temperature sensor TS1 is located at the midway, it can detect an average value of the temperature in the hot water storage tank 17.

In response to the temperature information TI, the controller 29 controls the start and stop operation of the engine 2. Since the temperature information TI represents the demand of heat or the thermal load from the hot water supply unit 21 which draws the hot water directly from the hot water storage tank 17 or from the heating system 24 which draws the hot water indirectly via the second heat exchanger 22, the controller 29 judges that the demand exceeds when the temperature information TI is not higher than a reference level Tref-1 and drives the engine 2 to generate the heat. On the other hand, when the temperature information TI is higher than the reference level Tref-1, the controller 29 judges that a sufficient level of the heat energy is saved in the hot water storage tank 17 and stops the operation of the engine 2.

The reference level Tref-1 of the temperature is determined from multiple parameters of the type and the magnitude of the thermal load (i.e. the type and the capacity of the hot water supply unit 21 and the heating system 24), the thermal output of the heat exchange unit 11, the volume of the hot water storage tank 17, and so on. The reference level Tref-1 has a hysteresis for ensuring a stable operation of the engine 2, i.e. avoiding frequent start and stop operations.

When the temperature Te of the engine is lower than the reference temperature Tref-2 regardless of the temperature T1 of hot water in the hot water storage tank 17 lower than Tref-e, the water pump 10 is switched on prior to the starting of the engine 2.

In case that the engine 2 is controlled on the basis of the temperature information TI, its operation may be contemplated for driving the power generator 3 to generate a constant power output or, in an electrical load dependent mode, to generate a variable output depending on the magnitude of the electrical load 15. In the constant power output mode, the engine 2 as a driving power source is operated to make the number of its revolutions constant and thus its operation will ensure a higher level of the efficiency minimizing the consumption of fuel and releasing an acceptable level of the exhaust gas. If the demand of electricity exceeds the output of the power generator 3, a deficiency in the electricity is covered by the supply from the commercial power supply system 14.

The temperature of the hot water in the hot water storage tank 17 is significantly varied depending on the consumption of the hot water, i.e. the demand of thermal energy, and the mode of the operation of the engine generator 10, e.g. either the constant output mode or the electrical load dependent mode. For example, in a system where when the consumption of the hot water is low, the temperature of the hot water can be maintained to about 80° C. with the power generator 3 operating in response to the temperature detected by the temperature sensor TS1, either abrupt, bulky consumption of the hot water resulting from the demand of heat given simultaneously from both the hot water supply unit 21 and the heating system 24 or the startup of the system may cause the temperature of the hot water in the hot water storage tank 17 to drop down to as a low degree as of the cool water supplied.

In case that the reference temperature of the hot water in the hot water storage tank 17 is hardly maintained with the heat collected from the engine 2, the re-heating boiler 25 functions effectively. The hot water controller 30 provides the re-heating boiler 25 and the three-directional valve 26 with a command "B" for re-heating and a command "C" for switching, respectively. The hot water controller 30 is preset with a lower reference temperature Tref-L which is lower than the reference temperature Tref-1 and when the temperature T1 of the hot water in the hot water storage tank 17 drops down to lower than the lower reference temperature Tref-L, it turns on the re-heating command "B" and the switching command "C". As the re-heating command "B" is turned on, the re-heating boiler 25 starts operating. As the switching command "C" is turned on, the three-directional valve 26 shifts its passage to the bypass 28. Accordingly, the hot water heated by the re-heating boiler 25 circulates through the conduit 23 and increases the temperature of the hot water in the hot water storage tank 17 via the second heat exchanger 22.

When the temperature of the hot water in the hot water storage tank 17 exceeds the lower reference temperature Tref-L, the re-heating command "B" and the switching command "C" are turned off to stop the operation of the re-heating boiler 25 and switch the three-directional valve 26 to the heating system 24 for the heating operation. The lower reference temperature Tref-L may have a hysteresis analogous to that of the reference temperature Tref-1.

As mentioned above, when the three-directional valve 26 has been switched to the bypass 28 responding to hot water supplying demand, the supply of the hot water to the heating system 24 stops. When the demand of the hot water supply unit 21 is to deliver the hot water to a bath or a kitchen, such delivery is rarely continued for an extensive length of time and thus stopping the supply of the hot water to the heating system 24 is also within only minutes. Accordingly, stopping duration of hot water circulation to the heating system 24 is also remains short. On the other hand, in the heating system 24 acting as the thermal load, the variation in the demand of the heat is rather moderate once the temperature in the room to be heated has risen up to its desired degree. Accordingly, since the temperature in the room seldom drops down extremely low with stopping of hot water circulation, there may unlikely be the occurrence of any problem in the practice.

Moreover, when the demand of the heat at the heating system 24 increases, the re-heating boiler 25 is turned on with the three-directional valve 26 switched to the heating system 24 thus to readily support the heating system 24 with a sufficient supply of the hot water. Increase of the demand of the heat at the heating system 24 may be judged based on a desired temperature preset in the heating system 24. It is also possible to have the three-directional valve 26 variable in the opening for returning at least a part of the hot water in the conduit 23 to the second heat exchanger 22 instead of switching of the entire flow of the hot water with the three-directional valve 26.

Figure 3:
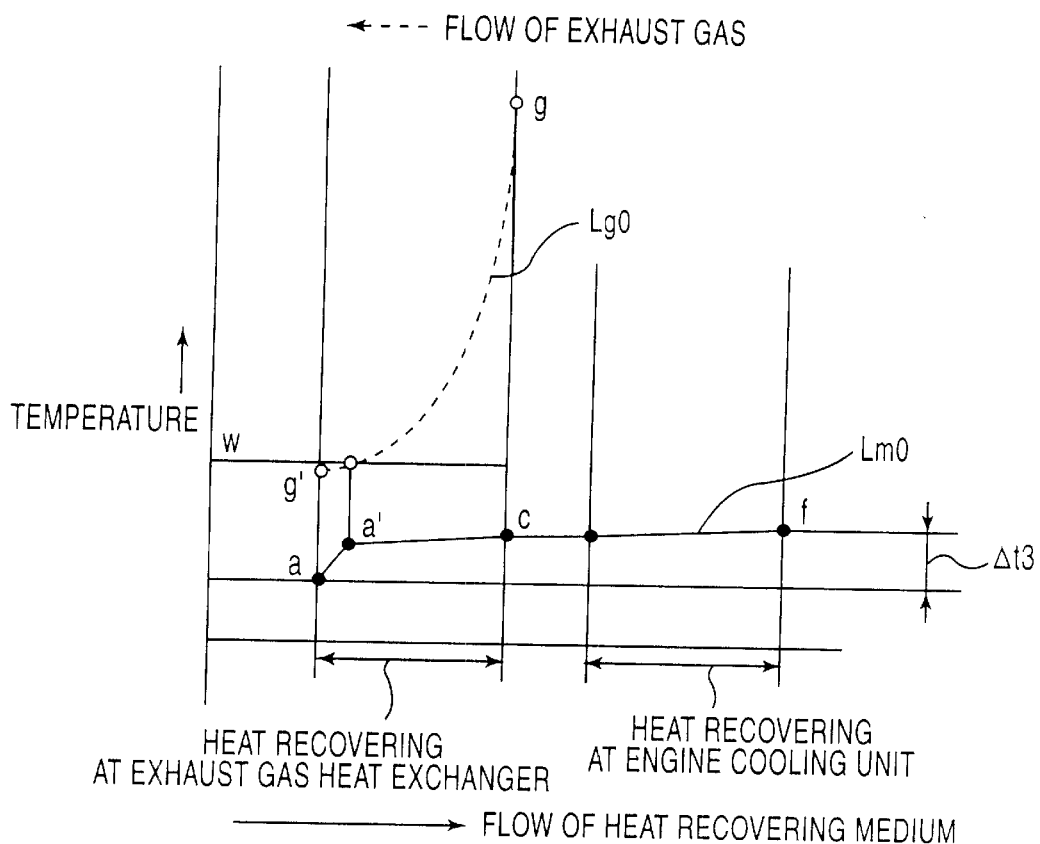
FIG. 3 is a diagram showing change in the temperature of a thermal medium and an exhaust gas.

In the exhaust gas heat exchanger 9, when the temperature of the exhaust gas is adjusted to lower than the dew point W of contents of the exhaust gas with an exhaust (gas) temperature detecting means provided between the inlet and the outlet, the recovery of condensation heat maybe carried out with a higher efficiency. FIG. 3 illustrates a change in the temperature of the heat transfer medium between the inlet of the exhaust gas heat exchanger 9 and the cylinder head 6. As shown, the temperature of the heat transfer medium varies as is denoted by the curve Lm0 while the temperature of the exhaust gas varies as is denoted by the curve Lg0. The exhaust gas heat exchanger 9 is of a counter-flow type where the heat transfer medium and the exhaust gas flow in opposite directions with each other. In the figure, the directions of flow of the heat transfer medium and the exhaust gas are opposite to each other.

The exhaust gas having a temperature g at the heat transfer medium outlet or the exhaust gas in let of the exhaust gas heat exchanger 9 drops down to a level g' lower than its dew point W at the heat transfer medium inlet or the exhaust gas outlet of the exhaust gas heat exchanger 9. In turn, the heat transfer medium introduced into the exhaust gas heat exchanger 9 draws the condensation heat of the exhaust gas and its temperature is sharply increased from a to a' within a short period of time. A gradient of the temperature increase (a–a') of the heat transfer medium across the exhaust gas heat exchanger 9 depends largely on the amount of flow and the initial temperature (a) of the heat transfer medium. The greater the flow of the heat transfer medium or the lower the initial temperature of the heat transfer medium, the more the gradient is acute.

During the transfer of heat from the exhaust gas having a temperature higher than the dew point W, the temperature of the heat transfer medium is moderately increased from a' to c at a less acute gradient than that of increasing from a to a'. The heat transfer medium having an increased temperature of c further receives heat from the engine cooling unit of the engine 2 and is then discharge from the waste heat recovering apparatus with its temperature increased up to f, hence yielding a temperature difference Δt3.

For efficiently recovering heat from the exhaust gas by means of transfer of the condensation heat of the contents of the exhaust gas, it is desired to control the flow and/or the temperature of the heat transfer medium to such a level that the temperature of the exhaust gas released from the exhaust gas heat exchanger 9 remains lower than the dew point W.

With the initial temperature of the heat transfer medium at (the inlet of) the exhaust gas heat exchanger 9 set to a fixed level, when the flow of the heat transfer medium is large, the efficiency of the transfer of heat from the exhaust gas is increased. If the flow is smaller, the efficiency of recovering heat from the exhaust gas is declined. Once the temperature required at the thermal load or the magnitude of the thermal load has been determined, the target flow of the heat transfer medium is preset in combination with the temperature of the heat transfer medium corresponding to the thermal load magnitude so that the temperature of the exhaust gas remains lower than the dew point W. The target flow may be calculated through experiments. The calculated target of the flow can be realized by controlling the revolutions of the water pump 10.

If the requirement temperature or target temperature of the thermal load is too high, that temperature may fail to be gained with the flow target of the transfer medium which is determined so that the temperature of the exhaust gas remains lower than the dew point W. For compensation, the flow of the heat transfer medium shall be reduced for increasing its temperature at the entrance of the heat exchanger 9 and thus decreasing the recovery of the condensation heat. Even in that case, it is desired that the overall operating duration of the apparatus includes a longer period of the operation in which the flow target of the heat transfer medium which is determined so that the temperature of the exhaust gas remains lower than the dew point W.

Alternatively, with the flow of the heat transfer medium set to a fixed rate, the temperature of the exhaust gas can be reduced to lower than the dew point W by adjusting the entrance temperature thereof. First, a reference level Tw of the entrance temperature is determined so that the temperature of the exhaust gas remains lower than the dew point W. If the entrance temperature exceeds the reference level Tw and the efficiency of the recovery of heat is declined, the engine 2 is stopped. As the engine 2 has stopped and the entrance temperature drops down to lower than the reference level Tw, the engine 2 is restarted. By this manner, the entrance temperature of the heat transfer medium can be maintained to the reference level Tw, hence allowing the recovery of heat at a higher efficiency. Preferably, a temperature sensor for measuring the entrance temperature is provided at the inlet of the exhaust gas heat exchanger 9. Alternatively, the temperature sensor may be mounted, across the circulation path of the heat transfer medium, at the upstream side of the water pump 10 or closely before or after the cylinder head 6.

Start and stop operation of the engine 2 maybe controlled by determining a reference level Tref-1 of the temperature information T1. More specifically, the relationship between the entrance temperature and the temperature information T1 of the heat transfer medium is predetermined and used for setting the reference level Tref-1 in relation to the reference level Tw. When the engine 2 starts and stops according to whether the entrance temperature is lower than the reference level Tref-1 of the temperature information, the temperature of the exhaust gas can be maintained lower than the dew point W.

If the temperature level required at higher thermal load with the reference temperature Tw of the heat transfer medium determined so as to maintain the temperature of the exhaust gas lower than the dew point W, required temperature level may hardly be obtained. In this case, the reference level Tw of the entrance temperature of the heat transfer medium is set relatively high to obtain such temperature level. Such an increased value of the reference temperature Tw should be determined through experiments, provided that the requirement at the thermal load is satisfied without significantly declining the efficiency of the transfer of heat throughout the operating duration which includes a period in which the temperature of the exhaust gas is kept higher than the dew point W. The same may result when timing of start and stop of the engine 2 is controlled by adjusting the hysteresis of the reference temperature Tref-1.

In case that a hot water tank 17 is provided, it is desired to maintain the temperature of hot water in the tank 17 to a particular level corresponding to the requirement at the thermal load. Assuming that the operation of the engine 2 is stopped when the temperature information T1 received from the temperature sensor TS1 is higher than the reference level Tref-1, the flow of the heat transfer medium can be determined in consideration of the operating conditions of the engine 2. More particularly, when the starting and stopping control of the engine 2 is proceeded to maintain the temperature of the hot water equal to the reference level Tref-1, the result of the operating conditions is utilized to calculate the amount of the waste heat released from the engine 2 through experiments and the flow of the heat transfer medium relative to the amount of the waste heat is thus determined so that the temperature remains not exceeding the reference level Tw. Accordingly, while the flow is fixed, the temperature of the heat transfer medium can be maintained to the reference level Tw through turning on and off the engine 2 hence allowing the temperature of the exhaust gas to remain lower than the dew point W.

In case that the temperature of the exhaust gas is maintained lower than the dew point W on the basis of the temperature of the heat transfer medium, like the case that the temperature of the exhaust gas is maintained lower than the dew point W on the basis of the flow of the heat transfer medium, it is desired to determine the temperature of the heat transfer medium so that the overall operating includes a longer period of the time when the temperature of the exhaust gas remains lower than the dew point W.

The controlling manner is not limited to the case in which one of the flow and the temperature of the heat transfer medium is controlled while the other is fixed but may be carried out with both the flow and the temperature being variable. In brief, the thermal energy of the heat transfer medium to be introduced into the exhaust gas heat exchanger 9 can favorably be controlled to such a level that the transfer of heat from the exhaust gas loaded into the exhaust gas heat exchanger 9 is most efficiently performed while satisfying the requirement at the thermal load.

It may also be possible to measure directly the temperature of the exhaust gas and determine the temperature and the flow of the heat transfer medium so that the temperature of the exhaust gas is converged to a reference level, instead of detecting and controlling the temperature and the flow of the heat transfer medium to their reference levels, for maintaining the temperature of the exhaust gas to lower than the dew point w. In that case, temperature sensors for measuring the temperature of the exhaust gas are provided in the exhaust gas heat exchanger 9 and at the upstream or downstream side of the same (preferably adjacent to the outlet of the exhaust gas).

As described, the flow and the temperature of the heat transfer medium at the entrance of the exhaust gas heat exchanger 9 are controlled to maintain the temperature of the exhaust gas lower than the dew point W in the exhaust gas heat exchanger 9, whereby the efficiency of transferring the condensation heat from the exhaust gas to the heat transfer medium can successfully be increased. Finally, the temperature of heat transfer medium goes up to "f", with the temperature increase (a temperature difference Δt3)

In the embodiment, the oil heat exchanger 5 is also employed for recovering heat from the oil in the oil pan 4. This is effective particularly when the temperature of the heat transfer medium can be increased with difficulty such as in very cold regions. While the oil heat exchanger 5 enables to effectively reduce the temperature of the oil, it may be omitted depending on the conditions of an installation site.

As apparent from the above description, the features of the present invention defined in claims 1 to 5 permit the engine to be warmed with hot water stored in the hot water storage tank and transferred by the operation of the pump without using any additional bulky component such as an electric heater which requires a considerable room for installation.

According to the feature defined in claim 2, the viscosity of the oil is decreased thus decreasing the cranking torque of the engine. Also, heat is recovered firstly from the oil heat exchanger in the normal driving mode, hence increasing the effect of cooling the oil.

According to the feature defined in claim 3, the exhaust gas heat exchanger is mounted prior to the engine cooling unit for condensing vapor contained in the exhaust gas with the action of the comparatively low temperature thermal medium. The heat of condensation can also be recovered. According to the feature defined in claim 4, the pump for circulating the thermal medium can be increased in the operating life.

What is claimed is:

1. An engine waste heat recovering apparatus which circulates a thermal medium through a heat recovery section of the engine to recover waste exhaust heat from the engine, comprising:

an exhaust gas waste heat exchanger in an exhaust gas conduit for exchanging exhaust gas waste heat to a thermal medium;

a conduit for circulating the thermal medium across a heat exchanger in an external hot water storage tank;

a pump mounted across the conduit, a means for measuring the temperature of the engine; and a controller for switching on the pump before starting the engine when the temperature of the engine at the start up is lower than a reference temperature predetermined for permitting the engine to be started.

2. An engine waste heat recovering apparatus which circulates a thermal medium through a heat recovery section of the engine to recover exhaust heat from the engine, comprising:

a conduit for circulating the thermal medium across a heat exchanger in an external hot water storage tank;

a pump mounted across the conduit;

a means for measuring the temperature of the engine; and a controller for switching on the pump before starting the engine when the temperature of the engine at the start up is lower than a reference temperature predetermined for permitting the engine to be started, wherein the heat recovery section of the engine includes an engine cooling unit equipped with a water jacket and an oil heat exchanger for recovering heat from the engine oil, and the circulation path is routed so that the thermal medium runs from the oil heat exchanger to the engine cooling unit.

3. An engine waste heat recovering apparatus according to claim 2, further comprising an exhaust gas heat exchanger for use of exhaust gas from the engine which is mounted across the circulation path at the upstream side of the engine cooling unit and wherein the thermal medium to be conveyed into the exhaust gas heat exchanger is controlled to be at a low temperature so that vapor contained in the exhaust gas of which heat is transferred to the thermal medium, drops down to below its dew point.

4. An engine waste heat recovering apparatus which circulates a thermal medium through a heat recovery section of the engine to recover exhaust heat from the engine, comprising:

a conduit for circulating the thermal medium across a heat exchanger in an external hot water storage tank;

a pump mounted across the conduit;

a means for measuring the temperature of the engine; and engine at the start up is lower than a reference temperature predetermined for permitting the engine to be started, wherein the heat recovery section of the engine includes an engine cooling unit equipped with a water jacket and an oil heat exchanger for recovering heat from the engine oil, and the circulation path is routed so that the thermal medium runs from the oil heat exchanger to the engine cooling unit, and wherein the pump is mounted on the thermal medium inlet side of the oil heat exchanger.

5. An engine waste heat recovering apparatus which circulates a thermal medium through a heat recovery section of the engine to recover exhaust heat from the engine, comprising:

a conduit for circulating the thermal medium across a heat exchanger in an external hot water storage tank;

a pump mounted across the conduit;

a means for measuring the temperature of the engine;

a controller for switching on the pump before starting the engine when the temperature of the engine at the start up is lower than a reference temperature predetermined for permitting the engine to be started, wherein the heat recovery section of the engine includes an engine cooling unit equipped with a water jacket and an oil heat exchanger for recovering heat from the engine oil, and the circulation path is routed so that the terminal medium runs from the oil heat exchanger to the engine cooling unit;

an exhaust gas heat exchanger for use of exhaust gas from the engine which is mounted across the circulation path at the upstream side of the engine cooling unit and wherein the thermal medium to be conveyed into the exhaust gas heat exchanger is controlled to be at a low temperature so that vapor contained in the exhaust gas of which heat is transferred to the thermal medium, drops down to below its dew point; and wherein the pump is mounted on the thermal medium inlet side of the oil heat exchanger.

* * * * *